US012597308B2

(12) United States Patent
Sahlén

(10) Patent No.: US 12,597,308 B2
(45) Date of Patent: Apr. 7, 2026

(54) ACCESS CONTROL SYSTEM

(71) Applicant: Total Security Stockholm AB, Solna (SE)

(72) Inventor: Joel Sahlén, Brottby (SE)

(73) Assignee: Total Security Stockholm AB, Solna (SE)

( * ) Notice: Subject to any disclaimer, the term of this patent is extended or adjusted under 35 U.S.C. 154(b) by 141 days.

(21) Appl. No.: 18/567,304

(22) PCT Filed: Jun. 3, 2022

(86) PCT No.: PCT/SE2022/050551
§ 371 (c)(1),
(2) Date: Dec. 5, 2023

(87) PCT Pub. No.: WO2022/260578
PCT Pub. Date: Dec. 15, 2022

(65) Prior Publication Data

US 2024/0265753 A1 Aug. 8, 2024

(30) Foreign Application Priority Data

Jun. 7, 2021 (SE) .................................... 2150719-9

(51) Int. Cl.
*G07C 9/00* (2020.01)
*G07C 9/20* (2020.01)

(52) U.S. Cl.
CPC ..... *G07C 9/00309* (2013.01); *G07C 9/00817* (2013.01); *G07C 9/20* (2020.01); *G07C 2009/00769* (2013.01)

(58) Field of Classification Search
CPC ... G07C 9/00309; G07C 9/00817; G07C 9/20
See application file for complete search history.

(56) References Cited

U.S. PATENT DOCUMENTS

2012/0075057 A1 3/2012 Fyke et al.
2014/0120905 A1 5/2014 Kim
(Continued)

FOREIGN PATENT DOCUMENTS

EP 2442282 A1 4/2012
EP 2894609 A1 7/2015

OTHER PUBLICATIONS

International Search Report and Written Opinion received for PCT Patent Application No. PCT/SE2022/050551, mailed on Jul. 12, 2022, 9 pages.
(Continued)

*Primary Examiner* — Nabil H Syed
(74) *Attorney, Agent, or Firm* — MEDLER FERRO WOODHOUSE & MILLS PLLC

(57) ABSTRACT

A system includes an access control arrangement, an NFC arrangement, an NFC antenna, a memory, and processing device. The NFC arrangement is arranged to: activate an NFC read/write mode in an NFC device with an active NFC field, by the NFC device sensing the NFC antenna in its NFC field; allow a virtual key from the NFC device to be written to the memory as an NDEF message, using the NFC read/write mode in the NFC device; immediately transfer the NDEF message from the memory to the at least one processing device; and delete the NDEF message from the memory as soon as it has been transferred to the processing device. The processing device is arranged to: receive the NDEF message representing the virtual key from the memory; compare the received virtual key to pre-stored valid virtual keys; and based on said comparison, take an access control decision, to grant or deny access.

15 Claims, 4 Drawing Sheets

(56) References Cited

U.S. PATENT DOCUMENTS

| | | | | |
|---|---|---|---|---|
| 2014/0145823 | A1 * | 5/2014 | Aase | G07C 9/00309 340/5.61 |
| 2015/0189505 | A1 | 7/2015 | Marien | |
| 2015/0199859 | A1 | 7/2015 | Ouyang et al. | |
| 2015/0208245 | A1 | 7/2015 | Robinton et al. | |
| 2015/0363599 | A1 | 12/2015 | Hoyer et al. | |
| 2019/0333301 | A1 | 10/2019 | Imanuel | |

OTHER PUBLICATIONS

Communication regarding the extended European search report (EESR) for Patent Application EP 22820660.3, mailed Mar. 11, 2025, 10 pages.

* cited by examiner

ACCESS CONTROL SYSTEM

CROSS-REFERENCE TO PRIOR APPLICATIONS

This application is a § 371 National Stage Application of PCT International Application No. PCT/SE2022/050551 filed Jun. 3, 2022, which claims priority to Swedish Patent Application No. 2150719-9 filed Jun. 7, 2021, each of which are incorporated herein in their entirety.

TECHNICAL FIELD

The present disclosure relates generally to systems and methods for taking an access control decision based on a virtual key received from an NFC device.

BACKGROUND

In physical access control systems, it is common to use an RFID tag, embedded in a specific device such as a card or a key fob, as a virtual key. An RFID reader, mounted near a door or gate to a location to which access is to be granted, reads the RFID tag from the card or key fob and grants access by unlocking the door or gate and allowing it to be opened, sometimes after first also requesting further credentials, such as e.g. an access code.

Mobile devices such as smartphones normally comprise functionality to use Near Field Communications (NFC) technology, that generally follows the same RFID standards as the RFID communication that is used for physical access systems. Smartphones could therefore be used for access granting, in the same way as cards and key fobs. One way of doing this would be to use the NFC card emulation mode that is generally available on smartphones. However, some smartphone manufacturers have blocked all external access to the NFC card emulation mode, in order to use the NFC card emulation mode only for proprietary functionalities, such as e.g. Apple Pay.

US20140145823 describes an access control system that enables an NFC device, such as a smartphone, to be used for access granting, using the NFC read/write mode in the NFC device instead of the NFC card emulation mode. In the NFC read/write mode, the NFC device reads data from or writes data to RFID tags. This functionality is generally available on smartphones.

In the system described in US20140145823, a local RFID tag with a memory having read/write capabilities is mounted near an RFID reader. In order to be granted access, the NFC device writes a virtual key to the memory in a local RFID tag, and the RFID reader can then read this virtual key from the local RFID tag and use it to take an access control decision. The local RFID tag is a passive RFID tag, which may be activated either by the NFC field generated by the NFC device or by the RF field generated by the RFID reader. The RFID tag cannot be activated by both the NFC device and the RFID reader at the same time.

Problems with the Prior Art

Since the local RFID tag may not be activated by both the NFC device and the RFID reader at the same time in the system described in US20140145823, the user needs to remove the NFC device from the local RFID tag before the RFID reader can read the virtual key from the local RFID tag. This means that the access control decision normally takes a few seconds, which may be irritating for a user who has to wait for e.g. a door to be opened.

There is also the risk that the RF field generated by the RFID reader automatically starts other functionality in the NFC device, such as e.g. Apple Pay, when the NFC device is within range of the RFID reader. This may also be irritating for a user, who has to turn off this functionality before writing the virtual key to the local RFID tag.

Further, the virtual key in the local RFID tag must be actively overwritten in order not to be accessible to other NFC devices when the access control decision has been taken. However, the virtual key cannot be overwritten until it has been read by the RFID reader, and as explained above, this takes a few seconds. The virtual key will thus be vulnerable to being read by any other NFC device that comes within range of the local RFID tag before the RFID reader has overwritten the virtual key.

The system described in US20140145823 also needs to determine whether the virtual key that is read is read from the local RFID tag instead of from another RFID tag, e.g. by storing the UID of the local RFID tag. There is thus a need for an improved access control system.

SUMMARY

The above described problem is addressed by the claimed system for taking an access control decision based on a virtual key received from an NFC device. The system may comprise an access control arrangement, comprising an NFC arrangement, comprising an NFC antenna and a memory, and at least one processing device, wherein the memory of the NFC arrangement is a volatile memory, which is physically connected to the at least one processing device. The NFC arrangement may be arranged to: activate an NFC read/write mode in an NFC device with an active NFC field, by the NFC device sensing the NFC antenna in its NFC field; allow a virtual key from the NFC device to be written to the memory as an NDEF message, using the NFC read/write mode in the NFC device; immediately transfer the NDEF message from the memory to the at least one processing device; and delete the NDEF message from the memory as soon as it has been transferred to the at least one processing device. The at least one processing device may be arranged to: receive the NDEF message representing the virtual key from the memory; compare the received virtual key to pre-stored valid virtual keys; and based on said comparison, take an access control decision, to grant or deny access.

The above described problem is further addressed by the claimed method for taking an access control decision based on a virtual key received from an NFC device, using an access control arrangement comprising an NFC arrangement, comprising a volatile memory, and at least one processing device, physically connected to the volatile memory of the NFC arrangement. The method may comprise: activating an NFC read/write mode in an NFC device with an active NFC field, by the NFC device sensing an NFC antenna, comprised in the NFC arrangement, in its NFC field; writing a virtual key, that has previously been stored in the NFC device, as an NDEF message to the volatile memory comprised in the NFC arrangement, using the NFC read/write mode in the NFC device; immediately transferring the NDEF message representing the virtual key from the memory to the at least one processing device; deleting the NDEF message from the memory as soon as it has been transferred to the at least one processing device; comparing the received virtual key to pre-stored valid virtual keys; and taking an access control decision, to grant or deny access, based on said comparison.

The physical connection between the at least one processing device and the volatile memory of the NFC arrangement may e.g. be in the form of cables, or by the at least one processing device and the volatile memory of the NFC arrangement being arranged on the same circuit board.

The virtual key is preferably automatically pushed from the memory to the at least one processing device as soon as it has been written to the memory by the NFC device. The immediate transfer of the NDEF message from the memory to the at least one processing device ensures that the transfer of the NDEF message from the memory to the at least one processing device takes place virtually instantaneously, typically within a few milliseconds.

This enables the use of an NFC device for access granting, without the need to use the NFC card emulation mode in the NFC device, or risking that the virtual key is read by any other NFC device before being deleted from the memory of the NFC arrangement. Permanent memories have a limited lifetime, since they can only accept a certain number of writes. Since volatile memories do not have such a limited lifetime, the use of a volatile memory makes the access control system more reliable.

In embodiments, the at least one processing device is arranged to send overwriting instructions to the memory of the NFC arrangement as soon as it has received the NDEF message representing the virtual key from the memory.

In embodiments, the NFC antenna of the NFC arrangement is arranged to sense when the NFC device is removed from its NFC field. This enables the at least one processing device to ensure that overwriting instructions are sent to the memory of the NFC arrangement before another NFC device enters the NFC field of the NFC antenna.

In embodiments, one or more apps in the NFC device are used to control the activating of the NFC read/write mode in the NFC device, and/or the writing of the virtual key to the memory in the NFC arrangement.

In embodiments, the access control decision is based also on receipt of at least one further credential. This increases security, since access is granted only if a further valid credential, such as e.g. a personal code or a fingerprint, is received by the processing device. The further credential may be input through various ways that are in themselves known in the art.

In embodiments, unlocking instructions are sent to least one locking arrangement, thereby unlocking at least one entrance blocking device, if the access control decision is to grant access. This enables the use of an NFC device for unlocking entrance blocking devices such as e.g. doors or gates.

In embodiments, the at least one entrance blocking device is automatically opened if the access control decision is to grant access. This is especially convenient if the entrance blocking device blocks the entrance to a location for vehicles, such as e.g. a garage or a parking lot.

In embodiments, the access control arrangement is located near the entrance blocking device. The access control arrangement may in such embodiments be located anywhere near the entrance blocking device, e.g. on a door/gate, on an elevator, on a wall next to a door/gate, in a door/gate controller, etc. If the access control arrangement is used in a door/gate controller for opening an entrance blocking device for a vehicle, e.g. a door, gate or road barrier, it is considered to be located near the entrance blocking device if it is located where the vehicle waits for the opening of the entrance blocking device before driving through. That the access control arrangement is located near the entrance blocking device thus simply means that it is nearer to the entrance blocking device with which it is associated than any other access control arrangement, and preferably also nearer to the entrance blocking device with which it is associated than to any other entrance blocking device.

The described invention may be used in any type of RFID/NFC access control setting, such as e.g. for residences, offices, hotels, garages, etc. The access control arrangement may also comprise a regular RFID reader reading cards or key fobs, in addition to the NFC arrangement.

The term NFC device covers any NFC-enabled device that comprises NFC read/write functionality, such as e.g. a smartphone or other type of mobile communications device, a tablet, or a laptop.

The at least one processing device may be one processing device, or a number of processing devices between which signals are transmitted. Some processing may e.g. take place in one processing device, and signals may then be transmitted to one or more other processing devices for further processing.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

The present disclosure relates generally to systems and methods for taking an access control decision based on a virtual key received from an NFC device, such as e.g. a smartphone.

NFC devices such as e.g. smartphones normally comprise NFC read/write functionality, that may be arranged to become automatically activated by the NFC device entering into an RF field generated by an RF reader, or by the NFC device sensing an NFC antenna in its NFC field. If the NFC device comprises a previously stored virtual key, the NFC device may be arranged to automatically write this virtual key to an RFID tag, when it is in proximity to an RFID reader and thus enters into the RF field produced by the RF reader, or when the NFC device senses an NFC antenna in its NFC field.

In the system described in US20140145823, the NFC device writes a virtual key to a local RFID tag, which stores the virtual key in a memory. The RFID reader then reads the virtual key from the local RFID tag.

According to the described invention, the virtual key is not stored in a memory in an RFID tag in order to be read by an RFID reader. Instead, the virtual key is automatically transferred to a processing device, without being read from any RFID tag. The virtual key is written as an NFC Data Exchange Format (NDEF) message to a memory in an NFC arrangement, which is connected to the processing device and automatically transfers the NDEF message to the processing device.

The claimed invention thus enables access to a location to be granted based on receiving a valid virtual key from an NFC device, without the need to use the NFC card emulation mode in the NFC device, or risking that the virtual key is read by any other NFC device before being deleted from the memory of the NFC arrangement. Embodiments of the disclosed solution are presented in more detail in connection with the figures.

Figure 1:
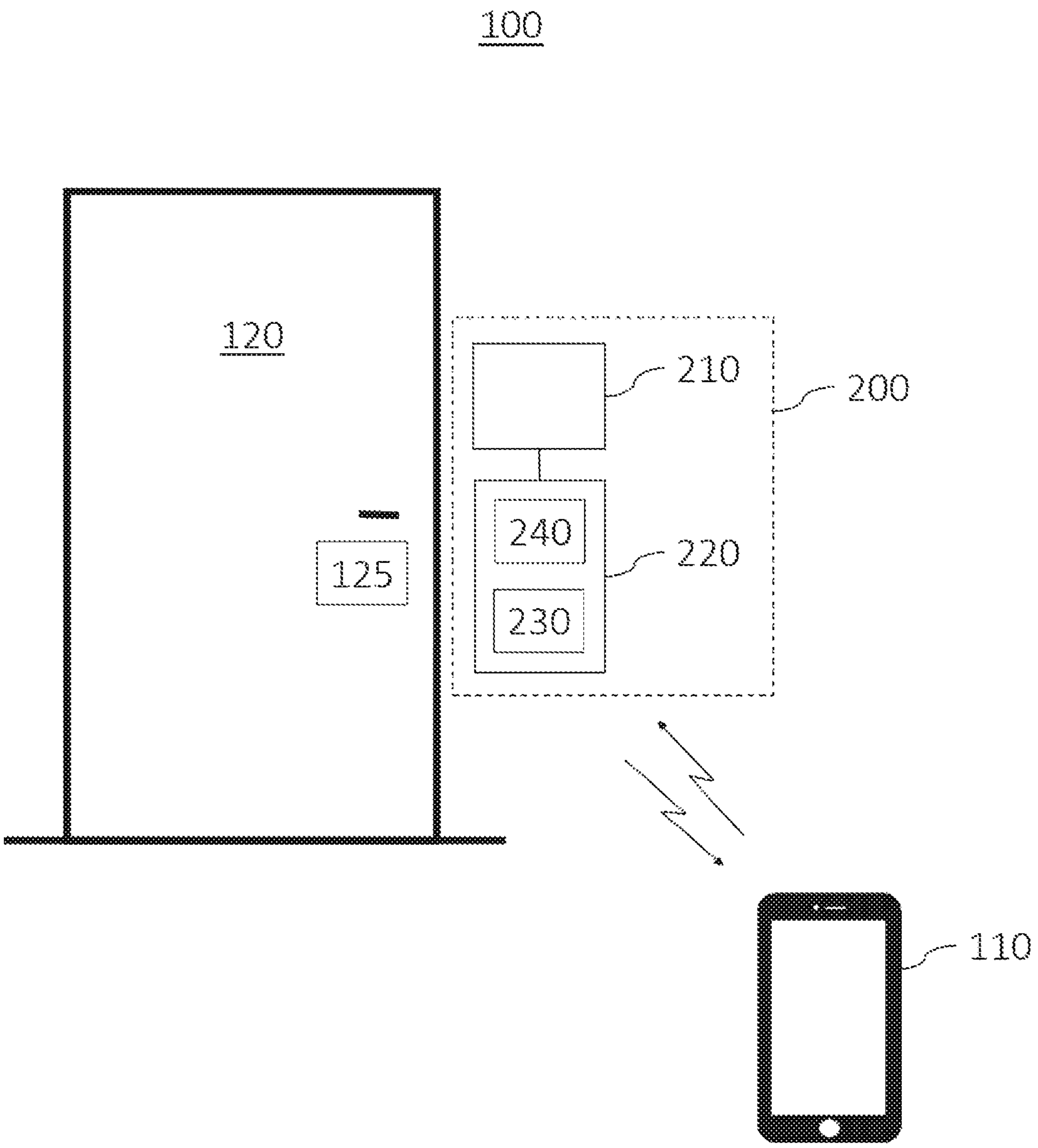
FIG. 1 schematically illustrates a system for taking an access control decision based on a virtual key received from an NFC device, in accordance with one or more embodiments described herein.

FIG. 1 schematically illustrates a system 100 for taking an access control decision based on a virtual key received from an NFC device 110. The system comprises an access control arrangement 200, which may e.g. be comprised in a housing mounted on a wall next to an entrance blocking device 120, in FIG. 1 illustrated as a door, as is common for RFID readers reading cards or key fobs in order to allow the opening of doors or gates. The entrance blocking device 120 may be arranged with a locking arrangement 125, as illustrated in FIG. 1. The locking arrangement 125 may e.g. comprise a door controller such as e.g. the Axis A1001 Network Door Controller operating with a relay that is used to lock or unlock the entrance blocking device (door) 120.

The access control arrangement 200 shown in FIG. 1 comprises an NFC arrangement 220, comprising an NFC antenna 230 and a memory 240, and a processing device 210. The NFC arrangement 220 may be arranged to activate an NFC read/write mode in an NFC device 110 with an active NFC field, by the NFC device 110 sensing the NFC antenna 230 in its NFC field. The NFC arrangement 220 is an active NFC arrangement, and thus the NFC device 110 will be able to sense the NFC antenna 230.

When an NFC device 110, such as e.g. a smartphone, is to be used for unlocking a door or a gate, a virtual key first needs to be stored in the NFC device 110. The virtual key is normally just a number code, in the same way as for other RFID codes. The virtual key may be received in the NFC device 110 through any means of communication, such as e.g. Bluetooth, IR, NFC, or via a mobile communication network. The virtual key may also be read into the NFC device 110 using a camera in the NFC device 110, e.g. as a QR code. There may be an app in the NFC device 110 that controls the receipt and storage of the virtual key. The same app may be arranged to activate the NFC read/write mode in the NFC device 110 when the NFC device 110 senses the NFC antenna 230 in its NFC field, and control the NFC device 110 to write the virtual key as an NDEF message to the memory 240 in the NFC arrangement 220. The app may be started manually by the user, and be arranged to write a virtual key selected by the user to the memory 240 in the NFC arrangement 220 as soon as the NFC device 110 senses the NFC antenna 230 in its NFC field. The app may also be arranged to be started automatically by the NFC device 110 when the NFC device 110 senses the NFC antenna 230 in its NFC field.

The virtual key may be a virtual key that is individual and unique to each user, and used as a personal identity in a number of different access control systems. In such embodiments, there will only be one virtual key in the NFC device 110, and thus the NFC device 110 does not have to receive instructions regarding which virtual key to write to the memory 240 in the NFC arrangement 220.

However, there may also be a number of different virtual keys stored in the NFC device 110. In such embodiments, the NFC device 110 must receive instructions regarding which virtual key to write to the memory 240 in the NFC arrangement 220. In embodiments, the user selects the virtual key in an app in the NFC device 110. However, the NFC device 110 may also be arranged to automatically select the correct virtual key based on an identity of the NFC antenna 230 that the NFC device 110 senses in its NFC field. There may in such embodiments be an app in the NFC device 110 that controls the pairing of virtual keys with NFC antenna IDs.

When the virtual key has been stored in the NFC device 110, the NFC device 110 may use the NFC read/write functionality to write the virtual key as an NDEF message to the memory 240 in the NFC arrangement 220. Since the NFC arrangement 220 is connected to the processing device 210, the NDEF message representing the virtual key is immediately transferred from the memory 240 to the processing device 210, and then deleted from the memory 240.

The memory 240 of the NFC arrangement 220 and the at least one processing device 210 are preferably physically connected, e.g. by cables or by being arranged on the same circuit board, so that the transfer of the NDEF message from the memory 240 to the at least one processing device 210 may take place virtually instantaneously, typically within a few milliseconds. The virtual key is preferably automatically pushed from the memory 240 to the at least one processing device 210 as soon as it has been written to the memory 240.

In embodiments, the at least one processing device 210 is arranged to send overwriting instructions to the memory 240 of the NFC arrangement 220 as soon as it has received the NDEF message representing the virtual key from the memory 240.

In embodiments, the NFC antenna 230 of the NFC arrangement 220 is arranged to sense when the NFC device 110 is removed from its NFC field. This enables the at least one processing device 210 to ensure that overwriting instructions are sent to the memory 240 of the NFC arrangement 220 before another NFC device 110 enters the NFC field of the NFC antenna 230.

The processing device 210 compares the received virtual key to pre-stored valid virtual keys, in order to take an access control decision. If the virtual key is valid, the access control decision will be to grant access, unless further credentials are needed. This enables the use of an NFC device 110 for access granting, without the need to use the NFC card emulation mode in the NFC device, or risking that the virtual key is read by any other NFC device before being deleted from the memory of the NFC arrangement.

In embodiments, the memory 240 of the NFC arrangement 220 is a volatile memory. Permanent memories have a limited lifetime, since they can only accept a certain number of writes. Since volatile memories do not have such a limited lifetime, the use of a volatile memory makes the access control system more reliable.

If the access control decision is to grant access, the processing device 210 may be arranged to send unlocking instructions to the locking arrangement 125, thereby unlocking the entrance blocking device 120. This enables the use of an NFC device for unlocking entrance blocking devices 120 such as e.g. doors or gates. In embodiments, the entrance blocking device 120 is not just unlocked, but also automatically opened, if the access control decision is to grant access. This is especially convenient if the entrance blocking device 120 blocks the entrance to a location for vehicles, such as e.g. a garage or a parking lot.

When the virtual key has been stored in the NFC device 110, the NFC device 110 does not need any connection to any network in order to be used for enabling access to a location to be granted. If a list of valid virtual keys has been pre-stored in the access control arrangement 200, the access control arrangement 200 also does not need any connection to any network for taking an access control decision. Normally, the access control arrangement 200 will be connected to e.g. the internet, for easy updating of the list of valid virtual keys, but the access granting functionality will work even if there is no such connection. In embodiments, the access control arrangement 200 may use NFC communication with the NFC device 110 to communicate with a backend service, by sending and receiving messages through the NFC device 110. An updated list of valid virtual keys may be received in this way, if there is no other means of communication with the backend service.

In embodiments, the access control decision is based also on receipt of at least one further credential. Such credentials may be in the form of a personal code, a fingerprint, or any other commonly used credential. This increases security, since access is then not granted unless the further credential is presented, even if a valid virtual key has been used. The further credential may be input through various ways that are in themselves known in the art.

Figure 2:
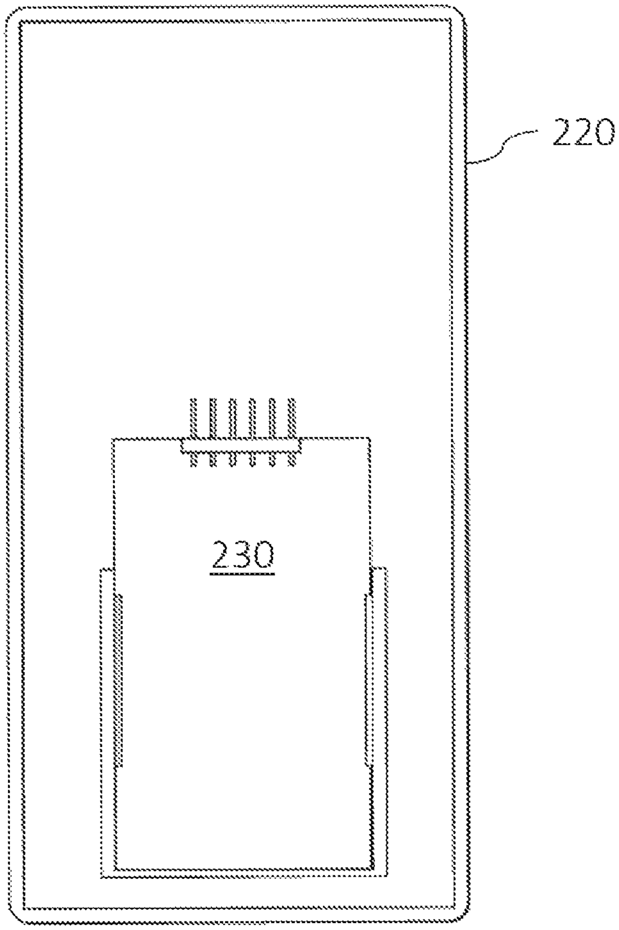
FIGS. 2 and 3 show different parts of an NFC arrangement, in accordance with one or more embodiments described herein.
Figure 3:
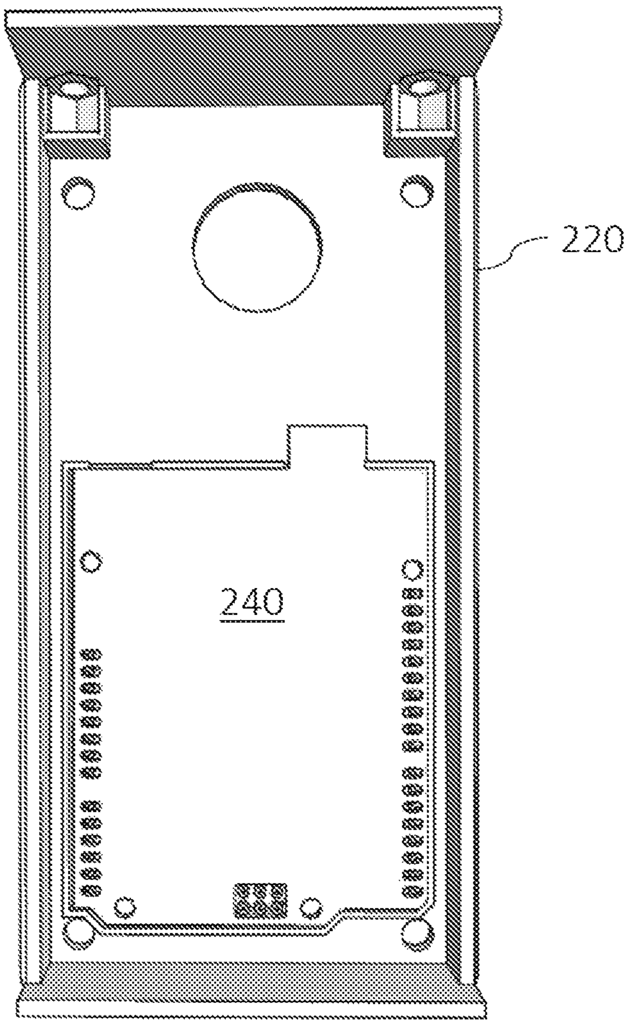

FIGS. 2 and 3 show an embodiment of an NFC arrangement 220, comprised in a housing. FIG. 2 shows the inside of the lid of the housing, on which the NFC antenna 230 may be arranged. FIG. 3 shows the inside of the bottom of the housing, where the memory 240 may be arranged, in embodiments together with a microcontroller. Such a microcontroller may be arranged to program the memory 240 to immediately transfer any received information to the at least one processing device 210. The microcontroller may also program the memory 240 to delete the information as soon as it has been transferred. The NFC antenna 230 is preferably physically connected to the memory 240, e.g. by cables or by being arranged on the same circuit board. The memory 240 may in embodiments be arranged in the NFC antenna 230.

The NFC arrangement 220 may e.g. be an NTAG 5 from NXP. The NTAG 5 is arranged with a pass-through mode, which allows data to be transferred directly from an NFC device to a processing device 210.

Figure 4:
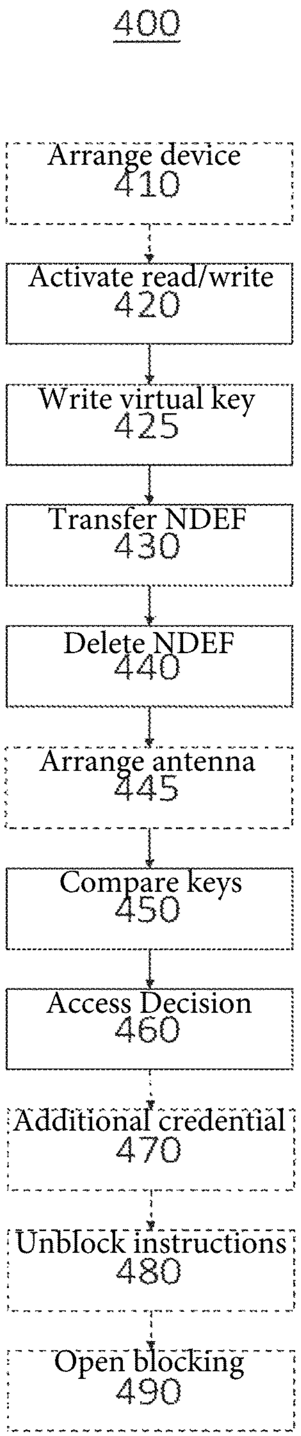
FIG. 4 schematically illustrates a method for taking an access control decision based on a virtual key received from an NFC device, in accordance with one or more embodiments described herein.

FIG. 4 schematically illustrates a method 400 for taking an access control decision based on a virtual key received from an NFC device 110, using an access control arrangement 200 comprising an NFC arrangement 220, comprising a volatile memory 240, and at least one processing device 210, physically connected to the volatile memory 240 of the NFC arrangement 220. The method 400 may comprise:

Step 420: activating an NFC read/write mode in an NFC device 110 with an active NFC field, by the NFC device 110 sensing an NFC antenna 230, comprised in the NFC arrangement 220, in said NFC field. The NFC arrangement 220 is an active NFC arrangement, and thus the NFC device 110 will be able to sense the NFC antenna 230.

Step 425: writing a virtual key, that has previously been stored in the NFC device 110, as an NDEF message to a memory 240 comprised in the NFC arrangement 220, using the NFC read/write mode in the NFC device 110.

Step 430: immediately transferring the NDEF message representing the virtual key from the volatile memory 240 to the at least one processing device 210.

Step 440: deleting the NDEF message from the memory 240 as soon as it has been transferred to the at least one processing device 210.

Step 450: comparing the received virtual key to pre-stored valid virtual keys.

Step 460: taking an access control decision, to grant or deny access, based on said comparison.

The physical connection between the at least one processing device 210 and the volatile memory 240 of the NFC arrangement 220 may e.g. be in the form of cables, or by the at least one processing device 210 and the volatile memory 240 of the NFC arrangement 220 being arranged on the same circuit board.

The virtual key is preferably automatically pushed from the memory 240 to the at least one processing device 210 as soon as it has been written to the memory 240 by the NFC device 110. The immediate transfer of the NDEF message from the memory 240 to the at least one processing device 110 ensures that the transfer of the NDEF message from the memory 240 to the at least one processing device 110 takes place virtually instantaneously, typically within a few milliseconds.

This enables the use of an NFC device for access granting, without the need to use the NFC card emulation mode in the NFC device, or risking that the virtual key is read by any other NFC device before being deleted from the memory of the NFC arrangement. Permanent memories have a limited lifetime, since they can only accept a certain number of writes. Since volatile memories do not have such a limited lifetime, the use of a volatile memory makes the access control system 100 more reliable.

In embodiments, the activating 420 of the NFC read/write mode in the NFC device 110, and/or the writing 425 of the virtual key to the memory 240 in the NFC arrangement 220, are controlled by an app in the NFC device 110.

In embodiments, the deleting 440 of the NDEF message from the memory 240 of the NFC arrangement 220 involves sending overwriting instructions from the least one processing device 210 to the memory 240 as soon as the least one processing device 210 has received the NDEF message representing the virtual key from the memory 240.

The method 400 may further comprise one or more of:

Step 410: arranging the access control arrangement 200 in a position near an entrance blocking device 120.

The access control arrangement 200 may in such embodiments be located anywhere near the entrance blocking device 120, e.g. on a door/gate, on an elevator, on a wall next to a door/gate, in a door/gate controller, etc. If the access control arrangement 200 is used in a door/gate controller for opening an entrance blocking device 120 for a vehicle, e.g. a door, gate or road barrier, it is considered to be located near the entrance blocking device 120 if it is located where the vehicle waits for the opening of the entrance blocking device 120 before driving through. That the access control arrangement 200 is located near the entrance blocking device 120 thus simply means that it is nearer to the entrance blocking device 120 with which it is associated than any other access control arrangement 200, and preferably also nearer to the entrance blocking device 120 with which it is associated than to any other entrance blocking device 120.

Step 445: arranging the NFC antenna 230 of the NFC arrangement 220 to sense when the NFC device 110 is removed from its NFC field. This enables the at least one processing device 210 to ensure that overwriting instructions are sent to the memory 240 of the NFC arrangement 220 before another NFC device 110 enters the NFC field of the NFC antenna 230.

Step 470: basing the access control decision also on receipt of at least one further credential. This increases security, since access is granted only if a further valid credential, such as e.g. a personal code or a fingerprint, is received by the processing device. The further credential may be input through various ways that are in themselves known in the art.

Step 480: sending unlocking instructions to at least one locking arrangement 125, thereby unlocking at least one entrance blocking device 120, if the access control decision is to grant access. This enables the use of an NFC device 110 for unlocking entrance blocking devices 120 such as e.g. doors or gates.

Step 490: automatically opening the at least one entrance blocking device 120 if the access control decision is to grant access. This is especially convenient if the entrance blocking device 120 blocks the entrance to a location for vehicles, such as e.g. a garage or a parking lot.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. For example, the locking arrangement 125 may be arranged to lock and unlock the entrance blocking device 120 without being arranged on or in the entrance blocking device 120 itself, e.g. by being arranged on a frame, interacting with the entrance blocking device 120. Accordingly, the scope of the invention is defined only by the claims.

The invention claimed is:

1. A system for taking an access control decision based on a virtual key received from an NFC device, the system comprising an access control arrangement, comprising an NFC arrangement, comprising an NFC antenna and a memory, and at least one processing device, wherein the memory of the NFC arrangement is a volatile memory, which is physically connected to the at least one processing device, wherein the NFC arrangement is arranged to:

activate an NFC read/write mode in the NFC device with an active NFC field, by the NFC device sensing the NFC antenna in said NFC field;

allow the virtual key from the NFC device to be written to the memory as a NFC Data Exchange Format (NDEF) message, using the NFC read/write mode in the NFC device;

immediately transfer the NDEF message from the memory to the at least one processing device so that the transfer of the NDEF message from the memory to the at least one processing device takes place virtually instantaneously; and delete the NDEF message from the memory as soon as it has been transferred to the at least one processing device, and wherein the at least one processing device is arranged to:

receive the NDEF message representing the virtual key from the memory;

compare the received virtual key to pre-stored valid virtual keys; and based on said comparison, take an access control decision, to grant or deny access.

2. The system according to claim 1, wherein the at least one processing device is arranged to send overwriting instructions to the memory of the NFC arrangement as soon as it has received the NDEF message representing the virtual key from the memory.

3. The system according to claim 1, wherein the NFC antenna of the NFC arrangement is arranged to sense when the NFC device is removed from its NFC field.

4. The system according to claim 1, wherein the at least one processing device is arranged to base the access control decision also on receipt of at least one further credential.

5. The system according to claim 1, wherein the system further comprises at least one entrance blocking device comprising at least one locking arrangement, and the at least one processing device is arranged to send unlocking instructions to the at least one locking arrangement if the access control decision is to grant access.

6. The system according to claim 5, wherein the system is arranged to automatically open the at least one entrance blocking device if the access control decision is to grant access.

7. The system according to claim 5, wherein the access control arrangement is located near the entrance blocking device.

8. A method for taking an access control decision based on a virtual key received from an NFC device, using an access control arrangement comprising an NFC arrangement, comprising a volatile memory, and at least one processing device, physically connected to the volatile memory of the NFC arrangement, the method comprising:

activating an NFC read/write mode in the NFC device with an active NFC field, by the NFC device sensing an NFC antenna, comprised in the NFC arrangement, in said NFC field;

writing the virtual key, that has previously been stored in the NFC device, as a NFC Data Exchange Format (NDEF) message to the volatile memory comprised in the NFC arrangement, using the NFC read/write mode in the NFC device;

immediately transferring the NDEF message representing the virtual key from the memory to the at least one processing device so that the transfer of the NDEF message from the memory to the at least one processing device takes place virtually instantaneously;

deleting the NDEF message from the memory as soon as it has been transferred to the at least one processing device;

comparing the received virtual key to pre-stored valid virtual keys; and taking an access control decision, to grant or deny access, based on said comparison.

9. The method according to claim 8, wherein the deleting of the NDEF message from the memory of the NFC arrangement involves sending overwriting instructions from the least one processing device to the memory as soon as the least one processing device has received the NDEF message representing the virtual key from the memory.

10. The method according to claim 8, wherein the activating of the NFC read/write mode in the NFC device, and the writing of the virtual key to the memory in the NFC arrangement, are controlled by an app in the NFC device.

11. The method according to claim 8, further comprising arranging the NFC antenna of the NFC arrangement to sense when the NFC device is removed from its NFC field.

12. The method according to claim 8, further comprising basing the access control decision also on receipt of at least one further credential.

13. The method according to claim 8, further comprising sending unlocking instructions to at least one locking arrangement, thereby unlocking at least one entrance blocking device, if the access control decision is to grant access.

14. The method according to claim 13, further comprising automatically opening the at least one entrance blocking device if the access control decision is to grant access.

15. The method according to claim 13, further comprising arranging the access control arrangement in a position near the entrance blocking device.

* * * * *